(12) United States Patent
Cho et al.

(10) Patent No.: US 9,122,050 B2
(45) Date of Patent: Sep. 1, 2015

(54) ELECTROWETTING DEVICE

(75) Inventors: Hyeon Gu Cho, Yongin-si (KR); Yung Kyung Park, Seoul (KR); Jae Jin Lyu, Yongin-si (KR)

(73) Assignee: Amazon Technologies, Inc., Reno, NV (US)

( * ) Notice: Subject to any disclaimer, the term of this patent is extended or adjusted under 35 U.S.C. 154(b) by 35 days.

(21) Appl. No.: 13/563,457

(22) Filed: Jul. 31, 2012

(65) Prior Publication Data

US 2013/0201547 A1 Aug. 8, 2013

(30) Foreign Application Priority Data

Feb. 8, 2012 (KR) .................. 10-2012-0013019

(51) Int. Cl.
*G02B 26/00* (2006.01)
*G02B 26/08* (2006.01)
*G02F 1/29* (2006.01)

(52) U.S. Cl.
CPC .................................. *G02B 26/005* (2013.01)

(58) Field of Classification Search
USPC ......... 359/237, 290–292, 295, 296, 298, 228, 359/242, 245, 253, 265, 315; 345/98, 55, 345/36, 38, 49, 50, 87
See application file for complete search history.

(56) References Cited

U.S. PATENT DOCUMENTS

| 6,309,729 | B1 * | 10/2001 | Glushko et al. ............... 428/64.1 |
| 7,630,116 | B2 | 12/2009 | Nakashima et al. |
| 7,646,525 | B2 * | 1/2010 | Cheng et al. .................. 359/245 |
| 7,800,816 | B2 | 9/2010 | Hayes et al. |
| 7,847,996 | B2 | 12/2010 | Chen et al. |
| 7,892,619 | B2 | 2/2011 | Kasperchik et al. |
| 7,898,714 | B2 | 3/2011 | Hagood, IV et al. |
| 2008/0225374 | A1 | 9/2008 | Hayes et al. |
| 2009/0232509 | A1 * | 9/2009 | Heikenfeld et al. .......... 398/118 |
| 2010/0214501 | A1 * | 8/2010 | Lee et al. ........................ 349/33 |
| 2012/0307347 | A1 * | 12/2012 | Clapp et al. ................... 359/296 |
| 2013/0009938 | A1 * | 1/2013 | Hwang et al. ................. 345/212 |
| 2013/0128335 | A1 * | 5/2013 | Parry-Jones et al. ......... 359/290 |

FOREIGN PATENT DOCUMENTS

| JP | 2009031795 A | 2/2009 |
| JP | 2009204685 A | 9/2009 |
| KR | 1020070097810 A | 10/2007 |
| KR | 1020080111658 A | 12/2008 |
| KR | 100982321 A | 9/2010 |
| KR | 1020110057771 A | 6/2011 |
| WO | 2010031860 A2 | 3/2010 |

* cited by examiner

*Primary Examiner* — Stephone B Allen
*Assistant Examiner* — Brandi Thomas
(74) *Attorney, Agent, or Firm* — Lee & Hayes, PLLC

(57) ABSTRACT

An electrowetting device includes: a lower substrate and an upper substrate which face each other; a first electrode on the lower substrate; an insulating layer on the first electrode; a second electrode on the upper substrate; and a first fluid and a second fluid between the upper substrate and the lower substrate. The first fluid includes a solvent, a dye and a scattering enhancer.

20 Claims, 3 Drawing Sheets

ELECTROWETTING DEVICE

This application claims priority to Korean Patent Application No. 10-2012-0013019 filed on Feb. 8, 2012, and all the benefits accruing therefrom under 35 U.S.C. §119, the entire contents of which are incorporated herein by reference.

BACKGROUND (a) Field

The invention relates to an electrowetting device.

(b) Description of the Related Art

Displays visually expressing electrical information signals have been quickly developed according to advances of the information age. In response to this trend, various flat panel displays having excellent characteristics such as thinness, light weight, and low power consumption have been quickly developed and have thus replaced the existing cathode ray tube ("CRT").

As examples of the flat panel displays, there are a liquid crystal display ("LCD"), a plasma display panel ("PDP"), a field emission display ("FED"), an electroluminescent display ("ELD") device, and an electrowetting display ("EWD") device.

Among the flat panel displays, the EWD device visually expresses an information signal by using an electrowetting phenomenon. Here, the electrowetting phenomenon is a phenomenon in which interfacial tension of a fluid in an electric field is changed and the fluid migrates or is deformed. In the EWD device, a hydrophilic liquid and a hydrophobic liquid are inserted inside a pixel, and interface tension of the hydrophilic liquid is changed by the electric field formed by a voltage applied from outside the pixel to move the hydrophobic liquid, thereby displaying an image. The EWD device has advantageous characteristics of small size, low power consumption, fast response speed, and high color brightness, thereby being spotlighted as one flat panel display of the next generation.

To control transmittance of light and to increase a contrast ratio of light and shapes, a material of the hydrophobic liquid of the EWD device must have high optical density.

SUMMARY

The invention provides an electrowetting display device with a hydrophobic liquid that increases optical density.

An exemplary embodiment of an electrowetting device includes: a lower substrate and an upper substrate which face each other; a first electrode on the lower substrate; an insulating layer on the first electrode; a second electrode on the upper substrate; and a first fluid and a second fluid between the upper substrate and the lower substrate. The first fluid includes a solvent, a dye and a scattering enhancer.

The second fluid may have polarity.

The first fluid may include a colored oil.

A particle size of the scattering enhancer may be in a range which is half of a visible ray wavelength band.

The particle size of the scattering enhancer may be about 150 nanometers (nm) to about 400 nm.

A distribution of the particle size of the scattering enhancer in a range of about 150 nm to about 400 nm, may be uniform.

A surface tension of the scattering enhancer may be in a range of about 17 dynes per centimeter (dyn/cm) to about 35 dyn/cm.

The first fluid may include a colored oil including the solvent and the dye, and the solvent of the colored oil and the scattering enhancer may have a same surface tension.

The solvent of the colored oil and the scattering enhancer may have the same density.

The scattering enhancer may include organic material.

The scattering enhancer may include at least one of silicon rubber, fluorinated silicon rubber, polyethylene, polypropylene, polystyrene and a combination thereof.

The first fluid including the scattering enhancer, excludes a dispersion medium.

A distribution of the scattering enhancer within the first fluid may be uniform.

The first fluid may include a colored oil including the solvent and the dye, and the solvent of the colored oil may include an alkane material.

The first fluid may include a colored oil including the solvent and the dye, and the dye of the colored oil may include at least one of an anthraquinone-based dye, an azo-based dye, a diazo-based dye and a combination thereof.

An exemplary embodiment of an electrowetting device includes: a first electrode on a lower substrate; a second electrode on an upper substrate; a hydrophobic first liquid, and a second liquid, between the first electrode and the second electrode; and a hydrophobic insulating layer between the hydrophobic first fluid and the lower substrate; wherein the hydrophobic first fluid includes a solvent, a colored dye and a scattering enhancer.

The colored dye may blocks transmission of light.

A particle size of the scattering enhancer may be about 150 nanometers to about 400 nanometers, and a distribution of the particles size in a range of about 150 nanometers to about 400 nanometers is uniform.

The solvent and the scattering enhancer of the hydrophobic first liquid may have a same surface tension.

The scattering enhancer may include at least one of silicon rubber, fluorinated silicon rubber, polyethylene, polypropylene, and polystyrene and a combination thereof.

As described above, in one or more exemplary embodiment of the invention, the scattering enhancer is mixed with and dispersed in the first fluid hydrophobic liquid such that the light absorption ratio of scattered light and re-scattered light of dye of the first fluid hydrophobic liquid is increased, thereby increasing the optical density of the first fluid hydrophobic liquid.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION

Figure 1:
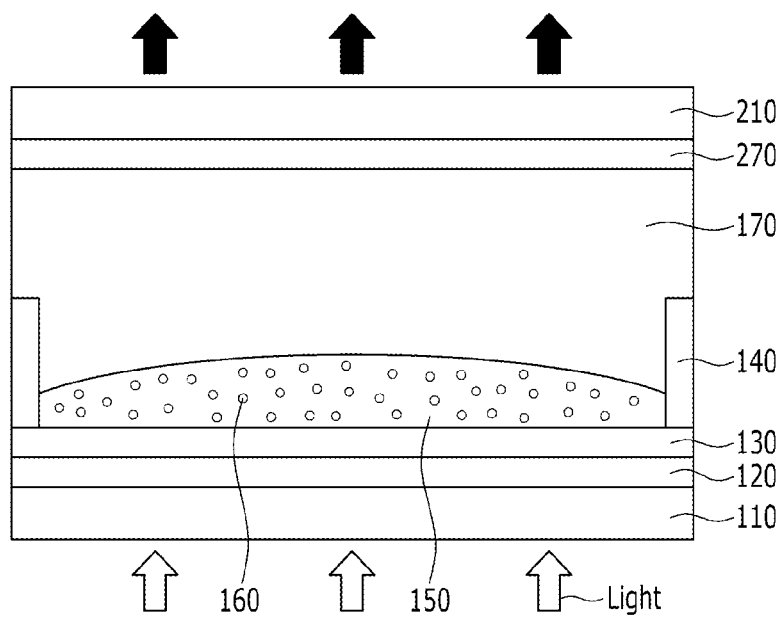
FIG. 1 is a cross-sectional view showing an exemplary embodiment of an electrowetting phenomenon according to the invention when a voltage is not applied to an electrowetting display device.

The invention will be described more fully hereinafter with reference to the accompanying drawings, in which exemplary embodiments of the invention are shown. However, it is to be understood that the invention is not limited to the disclosed embodiments, but, on the contrary, is intended to cover various modifications. As those skilled in the art would realize, the described embodiments may be modified in various different ways, all without departing from the spirit or scope of the invention.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. Like reference numerals designate like elements throughout the specification. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

FIG. 1 of a cross-sectional view showing an exemplary embodiment of an electrowetting phenomenon according to the invention when a voltage is not applied to an electrowetting display device.

Referring to FIG. 1, a first electrode 120 is disposed on a lower substrate 110, a second electrode 270 is disposed on an upper substrate 210, and the first electrode 120 and the second electrode 270 face each other. The lower substrate 110 and the upper substrate 210 may include a transparent glass or plastic. The first electrode 120 and the second electrode 270 may be directly on the lower substrate 110 and the upper substrate 210, respectively, or an intervening layer may be therebetween.

The first electrode 120 and the second electrode 270 may include a transparent conductive material such as indium tin oxide ("ITO"), indium zinc oxide ("IZO"), and indium gallium zinc oxide ("IGZO").

A hydrophobic insulating layer 130 is on the first electrode 120. The hydrophobic insulating layer 130 may be directly on the first electrode 120, or an intervening layer may be therebetween.

A first fluid 150 and a second fluid 170 are interposed between the lower substrate 110 and the upper substrate 210. The first fluid 150 is a non-polar, non-conductive liquid, and the second fluid 170 is a polar liquid, such that the first fluid 150 and the second fluid 170 are not mixed with each other. The second fluid 170 may have electrical conductivity.

The first fluid 150 includes a colored oil including a solvent and a dye, and a scattering enhancer 160. The first fluid 150 may include a dye of a predetermined color, or may include a black dye. The second fluid 170 may include ultrapure water including an electrolyte in a small amount. The colored oil of the first fluid 150 may represent various colors while including, but not limited to, the black color.

The solvent included in the colored oil of the first fluid 150 may include an alkane material such as a decane, a dodecane, or a tetradecane. The dye included in the colored oil of the first fluid 150 may include an anthraquinone-based dye, an azo-based dye, a diazo-based dye, or a material including a combination thereof.

Figure 2:
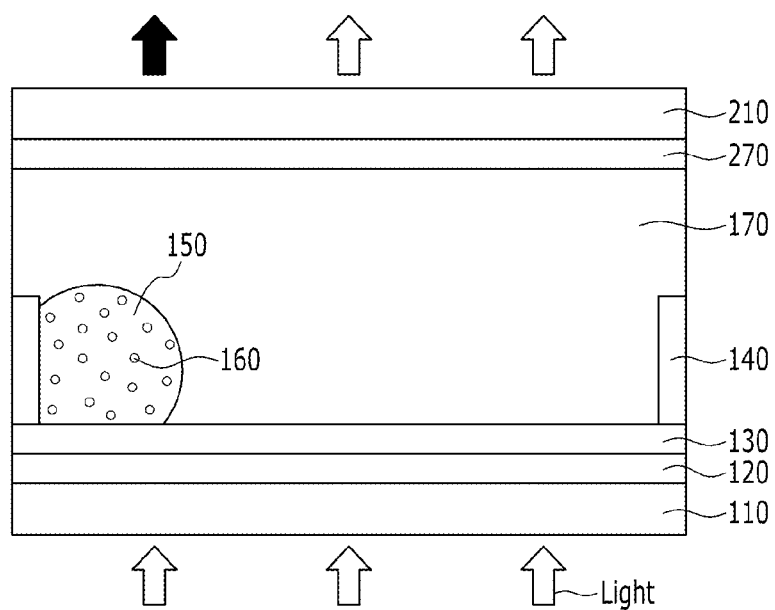
FIG. 2 is a cross-sectional view showing an exemplary embodiment of an electrowetting phenomenon when a voltage is applied to the electrowetting display device of FIG. 1.

In the exemplary embodiment of the electrowetting device, the first fluid 150 includes the scattering enhancer 160. The scattering enhancer 160 may be uniformly distributed in the first fluid 150. As illustrated in FIG. 1 and FIG. 2, for example, particles of the scattering enhancer 160 are spaced apart from each other by substantially regular intervals and are located across an entire area of the first fluid 150, such that the scattering enhancer 160 is considered to be substantially uniformly distributed in the first fluid 150.

In a conventional electrowetting device, the optical density of an oil including a dye without a scattering enhancer 160 in the first fluid 150 is low such that a color sharpness may be decreased when realizing the color in displaying an image. However, according to one or more exemplary embodiments of the invention, scattering or re-scattering of incident light is generated by the scattering enhancer 160 such that the light absorption rate of the dye included in the first fluid 150 is increased, and resultantly the optical density of the colored oil of the first fluid 150 is increased.

The scattering enhancer 160 may include an organic material, and has a substantially similar or same surface tension and density as the solvent of the first fluid 150. In detail, the scattering enhancer 160 may have surface tension in a range of about 17 dynes per centimeter (dyn/cm) to about 35 dyn/cm. The scattering enhancer 160 may include silicon rubber, fluorinated silicon rubber, polyethylene, polypropylene, polystyrene, or a material including a combination thereof.

A partition 140 dividing a plurality of pixels is between the lower substrate 110 and the upper substrate 210. In FIG. 1, for convenience of description, one pixel is shown. The partition 140 may include an insulating material having a hydrophilic characteristic. The first fluid 150 and the second fluid 170 are disposed between adjacent partition 140 portions. The partition 140 reduces or effectively prevents movement of the first fluid 150 between adjacent pixels.

The insulating layer 130 disposed on the first electrode 120 has the hydrophobic characteristic such that it repels the second fluid 170 including the polar liquid such that the first fluid 150 is disposed between the second fluid 170 and the hydrophobic insulating layer 130. Also, the partition 140 is hydrophilic such that the second fluid 170 is attracted to the surface of the partition 140. Accordingly, the second fluid 170 is repelled by the insulating layer 130 and is attracted to the partition 140, and accordingly the first fluid 150 is enclosed by the second fluid 170. The first fluid 150 may maintain a lens shape by the enclosing second fluid 170.

FIG. 1 shows the lens shape of the first fluid 150 having a slight curvature when a voltage is not applied to the first electrode 120 and the second electrode 270. That is, when the voltage is not applied to the first electrode 120 and the second electrode 270, the first fluid 150 covers (e.g., overlaps) an entire of the pixel defined by the partition 140 such that the incident light indicated by the unshaded upward arrows below the lower substrate 110, is transmitted according to a color of the first fluid 150. In one exemplary embodiment, for example, when the first fluid 150 represents a black color, a black state or black color indicated by the shaded upward arrows above the upper substrate 210, is displayed by the pixel when the voltage is not applied to the first electrode 120 and the second electrode 270 since the first fluid 150 overlaps an entire of the pixel between the adjacent partition 140 portions.

FIG. 2 is a cross-sectional view showing an exemplary embodiment of an electrowetting phenomenon when a voltage is applied to the electrowetting device of FIG. 1.

Referring to FIG. 2, if the first electrode 120 and the second electrode 270 are applied with voltages, the second fluid 170 is disposed to contact a portion of the insulating layer 130, and thereby the first fluid 150 is pushed and displaced by the second fluid 170 and is collected at the partition 140. As described above, the incident light indicated by the unshaded upward arrows below the lower substrate 110, is transmitted according to a color of the first fluid 150.

Accordingly, when the first fluid 150 represents the black color, the light incident from outside and sequentially passing through the first substrate 110, the first electrode 120 and the insulating layer 130, is transmitted through a portion of the second fluid 170 since it is not blocked by the first fluid 150. That is, when the first fluid 150 represents a black color, a black state or black color indicated by the shaded upward leftmost arrow above the upper substrate 210, is displayed by a portion of the pixel when the voltages are applied to the first electrode 120 and the second electrode 270 since the first fluid 150 blocks a portion of the pixel between the adjacent partition 140 portions.

In this way, the first fluid 150 may function as a shutter for selectively blocking and allowing transmission of the incident light by the movement or the displacement of the first fluid 150 that is induced according to the application of the electric field to the first electrode 120 and the second electrode 270.

Next, a phenomenon in which the optical density of the first fluid 150 is increased when the first fluid 150 includes the scattering enhancer will be described with reference to FIG. 3.

Figure 3:
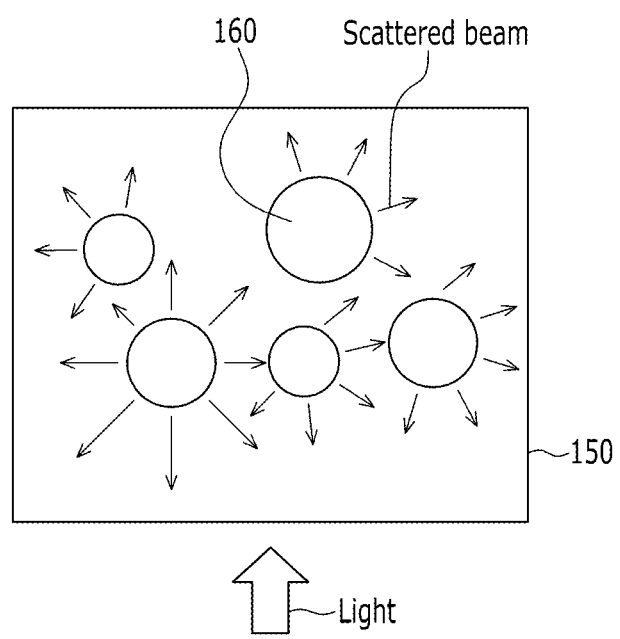
FIG. 3 is an enlarged view showing an exemplary embodiment of a hydrophobic liquid including a scattering enhancer, according to the invention.

FIG. 3 is an enlarged view showing an exemplary embodiment of a hydrophobic liquid including a scattering enhancer according to the invention.

Referring to FIG. 3, the first fluid 150 of a hydrophobic liquid includes a scattering enhancer 160.

The scattering enhancer functions as a diffuser such that incident light transmitted through the first fluid 150 renders a robust color, such as when an image is displayed using the color. In detail, the scattering enhancer 160 generates scattering of incident light and re-scattering of the scattered light. The 'scattered beam' indicated in FIG. 3 may indicate both the scattered light and the re-scattered light. The frequency at which the scattered light is exposed to the dye of the first fluid 150 is increased such that the light absorption ratio for the scattered light and the re-scattered light of the dye included in the colored oil of the first fluid 150 is increased, and thereby the optical density of the colored oil is increased.

From a viewpoint of particle scatter theory, scatter is maximized when the scattered light wavelength is double the particle size. In one exemplary embodiment, a particle size of the scattering enhancer 160 may be about 150 nanometers (nm) to about 400 nm, which is half of the wavelength band of visible light.

Also, the particle size of the scattering enhancer 160 within the range of about 150 nm to about 400 nm, is uniformly distributed rather than the particle size being concentrated at a particular dimension.

In an exemplary embodiment of the first fluid 150, the scattering enhancer 160 may be dispersed in the first fluid 150 without a dispersion medium in order not to deteriorate the characteristics of the colored oil of the first fluid 150. Where the dispersion medium deteriorates the characteristics of the colored oil of the first fluid 150, a charge may be generated such that the colored oil of the first fluid 150 does not gather or collect, and instead is diffused in a state in which voltage is applied.

Where the scattering enhancer 160 is dispersed without the dispersion medium, the scattering enhancer 160 may include a polymer material having a substantially similar or same surface tension and density to that of the colored oil or the solvent of the first fluid 150. In detail, the scattering enhancer 160 may have surface tension in a range of about 17 dyn/cm to about 35 dyn/cm. Also, the scattering enhancer 160 may include silicon rubber, fluorinated silicon rubber, polyethylene, polypropylene, polystyrene, or a material including a combination thereof. The scattering enhancer 160 may be transparent.

One or more exemplary embodiments of the electrowetting device according to the invention may be applied in various fields such as a liquid lens, a micropump, a display device, an optical device and microelectromechanical systems ("MEMS").

Particularly, when the electrowetting device is applied to the display device, the electrowetting device may be divided into a reflective electrowetting display device in which the light incident from the outside is reflected and emitted through a pixel opening, and a transmissive electrowetting display device in which the light emitted from a backlight unit disposed under the electrowetting display panel is transmitted and emitted through the pixel opening.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrowetting device comprising:
a lower substrate and an upper substrate which face each other;
a first electrode on the lower substrate;
an insulating layer on the first electrode;
a second electrode on the upper substrate; and
a first fluid and a second fluid between the upper substrate and the lower substrate,
wherein the first fluid includes a solvent, a dye and a scattering enhancer.

2. The electrowetting device of claim 1, wherein the second fluid has polarity.

3. The electrowetting device of claim 1, wherein the first fluid includes a colored oil.

4. The electrowetting device of claim 1, wherein a particle size of the scattering enhancer is in a range which is half of a visible ray wavelength band.

5. The electrowetting device of claim 4, wherein the particle size of the scattering enhancer is about 150 nanometers to about 400 nanometers.

6. The electrowetting device of claim 5, wherein a distribution of the particle size of the scattering enhancer in a range of about 150 nanometers to about 400 nanometers, is uniform.

7. The electrowetting device of claim 1, wherein a surface tension of the scattering enhancer is in a range of about 17 dynes per centimeter to about 35 dynes per centimeter.

8. The electrowetting device of claim 7, wherein the first fluid includes a colored oil including the solvent and the dye, and
the solvent of the colored oil and the scattering enhancer have a same surface tension.

9. The electrowetting device of claim 8, wherein the solvent of the colored oil and the scattering enhancer have the same density.

10. The electrowetting device of claim 1, wherein the scattering enhancer includes an organic material.

11. The electrowetting device of claim 10, wherein the scattering enhancer includes at least one of silicon rubber, fluorinated silicon rubber, polyethylene, polypropylene, polystyrene and a combination thereof.

12. The electrowetting device of claim 1, wherein the first fluid including the scattering enhancer, excludes a dispersion medium.

13. The electrowetting device of claim 1, wherein a distribution of the scattering enhancer within the first fluid is uniform.

14. The electrowetting device of claim 1, wherein the first fluid includes a colored oil including the solvent and the dye, and
the solvent of the colored oil includes an alkane material.

15. The electrowetting device of claim 1, wherein the first fluid includes a colored oil including the solvent and the dye, and
the dye of the colored oil includes at least one of an anthraquinone-based dye, an azo-based dye, a diazo-based dye and a combination thereof.

16. An electrowetting device comprising:
a first electrode on a lower substrate;
a second electrode on an upper substrate;
a hydrophobic first liquid, and a second liquid, between the first electrode and the second electrode; and
a hydrophobic insulating layer between the hydrophobic first liquid and the lower substrate;
wherein the hydrophobic first liquid includes a solvent, a colored dye and a scattering enhancer.

17. The electrowetting device of claim 16, wherein the colored dye blocks transmission of light.

18. The electrowetting device of claim 16, wherein
a particle size of the scattering enhancer is about 150 nanometers to about 400 nanometers, and
a distribution of the particles size in a range of about 150 nanometers to about 400 nanometers is uniform.

19. The electrowetting device of claim 16, wherein the solvent and the scattering enhancer of the hydrophobic first liquid have a same surface tension.

20. The electrowetting device of claim 16, wherein the scattering enhancer includes at least one of silicon rubber, fluorinated silicon rubber, polyethylene, polypropylene, and polystyrene and a combination thereof.

* * * * *